United States Patent
Lai et al.

(10) Patent No.: US 7,313,057 B2
(45) Date of Patent: Dec. 25, 2007

(54) METHOD FOR ADJUSTING A CONTROL PARAMETER AND OPTICAL DISC DRIVE SERVER SYSTEM USING THE SAME

(75) Inventors: Yi-Lin Lai, Taipei (TW); Chin-Yin Tsai, Junghe (TW)

(73) Assignee: Via Technologies, Inc., Taipei (TW)

(*) Notice: Subject to any disclaimer, the term of this patent is extended or adjusted under 35 U.S.C. 154(b) by 609 days.

(21) Appl. No.: 10/892,849

(22) Filed: Jul. 16, 2004

(65) Prior Publication Data
US 2005/0013215 A1 Jan. 20, 2005

Related U.S. Application Data

(60) Provisional application No. 60/488,698, filed on Jul. 18, 2003.

(51) Int. Cl.
*G11B 7/00* (2006.01)
(52) U.S. Cl. .............. 369/44.29; 369/44.35; 369/44.34
(58) Field of Classification Search ............. None
See application file for complete search history.

(56) References Cited

U.S. PATENT DOCUMENTS 5,761,164 A * 6/1998 Abe et al. ............. 369/44.36
5,910,751 A * 6/1999 Winn et al. ............. 327/560
6,833,766 B2 * 12/2004 Kim et al. ............. 331/17
6,999,012 B2 * 2/2006 Kim et al. ............. 341/119
2003/0011437 A1 * 1/2003 Ozawa ............. 331/2

FOREIGN PATENT DOCUMENTS

CN 1221254 A 6/1999

\* cited by examiner

*Primary Examiner*—William Korzuch
*Assistant Examiner*—Joseph R. Haley
(74) *Attorney, Agent, or Firm*—Thomas, Kayden, Horstemeyer & Risley

(57) ABSTRACT

A method for adjusting a control parameter is adopted in an optical disc drive server system, which has a compensator, a control loop and a parameter regulator. The control loop includes an optical pickup and outputs a first tracking error signal/focus error signal. The compensator adjusts the first tracking error signal/focus error signal to obtain a compensated signal for driving the optical pickup to read/write the optical disc. The parameter regulator generates a first sinusoidal signal to be inputted to the control loop, which amplifies the first sinusoidal signal to obtain a second sinusoidal signal. The parameter regulator filters the second sinusoidal signal and calculates a relationship between the first sinusoidal signal and the second sinusoidal signal to obtain a control parameter. The parameter regulator adjusts the compensator to output the compensated signal according to the control parameter.

12 Claims, 4 Drawing Sheets

METHOD FOR ADJUSTING A CONTROL PARAMETER AND OPTICAL DISC DRIVE SERVER SYSTEM USING THE SAME

This application claims the benefit of U.S. provisional application Ser. No. 60/488,698, filed Jul. 18, 2003, the subject matter of which is incorporated herein by reference.

BACKGROUND OF THE INVENTION

1. Field of the Invention

The invention relates in general to a method for adjusting a control parameter and an optical disc drive server system using the same, and more particularly to a method and a device, which are adopted in a control loop of an optical disc drive server system and for inputting a sinusoidal signal to the control loop in an open loop manner so as to obtain the control parameter of the control loop.

2. Description of the Related Art

FIG. 1 is a block diagram showing a conventional optical disc drive servo system. As shown in FIG. 1, an optical sensor 102 receives an optical signal reflected from the disc (not shown), converts the optical signal into an electric signal, and outputs the electric signal to a pre-amplifier 104 to obtain a tracking error signal/focus error signal Te/Fe. The tracking error signal/focus error signal Te/Fe processed by an ADC (Analog to Digital Converter) 106 is inputted to a compensator 108, which compensates for a gain and a phase thereof. The compensated tracking error signal/focus error signal Te/Fe is processed by a DAC (Digital to Analog Converter) 110, and then a signal Tro/Foo is obtained. The signal Tro/Foo is inputted to a driving circuit 114 so that a control signal T/F for controlling a position of an optical pickup 116 is generated. The laser diode (not shown) of the optical pickup 116 generates a laser beam to read/write the disc. It is to be noted that the ADC 106, the compensator 108 and the DAC 110 may be designed in the same ASIC 112.

However, after the optical disc drive has operated for a long period of time, the system's physical property is changed owing to the temperature variation. That is, the gain of the control loop 120 constituted by the driving circuit 114, the optical pickup 116, the optical sensor 102 and the pre-amplifier 104 is changed and makes the system unstable. The system's unstable state influences the disc reading/writing operations.

The conventional optical disc drive overcomes the system's unstable condition by two methods. The first method is to additionally dispose a temperature sensor in the system in order to sense the temperature variation. Then, the gain variation of the control loop 120 may be estimated according to the temperature variation. This method, however, cannot obtain the precise gain variation, and the improvement to the system's unstable condition is thus limited. In addition, the extra component increases the cost of the optical disc drive. The second method is to reduce the reading/writing speed of the optical disc drive for the purpose of reducing the error in reading/writing. However, this method cannot really solve the problem of gain variation.

SUMMARY OF THE INVENTION

In view of this, it is therefore an object of the invention to provide a method for adjusting a control parameter used in a control loop of an optical disc drive server system, and an optical disc drive server system using the same. The sinusoidal signal is inputted to the control loop in an open loop manner so that the gain variation of the control loop is obtained. Consequently, the gain variation of the control loop may be precisely obtained in order to adjust the control parameter and thus solve the unstable problem of the system.

The invention achieves the above-identified object by providing a method for adjusting a control parameter, which is adopted in an optical disc drive server system. The optical disc drive server system has a compensator, a control loop and a parameter regulator. The control loop includes an optical sensor, a pre-amplifier, a driving circuit and an optical pickup. The optical sensor receives a reflected light ray from a disc and converts the reflected light ray into an electric signal. The pre-amplifier converts the electric signal into a first tracking error signal/focus error signal. The compensator adjusts the first tracking error signal/focus error signal to obtain a compensated signal. The driving circuit receives the compensated signal. The optical pickup is driven by the driving circuit, and the optical pickup generates a light beam to read/write the disc. The parameter regulator generates a first sinusoidal signal to be inputted to the control loop. The control loop amplifies the first sinusoidal signal to obtain a second sinusoidal signal. The parameter regulator filters the second sinusoidal signal and calculates a relationship between the first sinusoidal signal and the second sinusoidal signal so as to obtain the control parameter. The parameter regulator adjusts the compensator to output the compensated signal according to the control parameter.

The invention also achieves the above-identified object by providing an optical disc drive server system having a compensator, a control loop and a parameter regulator. The control loop includes an optical sensor, a pre-amplifier, a driving circuit and an optical pickup. The optical sensor receives a reflected light ray from a disc and converts the reflected light ray into an electric signal. The pre-amplifier converts the electric signal into a first tracking error signal/focus error signal. The compensator adjusts the first tracking error signal/focus error signal to obtain a compensated signal. The driving circuit receives the compensated signal so as to drive the optical pickup to generate a light beam to read/write the disc. The parameter regulator includes a signal generator, a band-pass filter and a controller. The signal generator generates a first sinusoidal signal. The first sinusoidal signal and the compensated signal are inputted to the control loop. The control loop amplifies the first sinusoidal signal to obtain a second sinusoidal signal. The band-pass filter receives the first tracking error signal/focus error signal and the second sinusoidal signal, and then filters the second sinusoidal signal. The controller calculates a relationship between the second sinusoidal signal and the first sinusoidal signal to obtain a control parameter. The compensator adjusts the compensated signal according to the control parameter.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
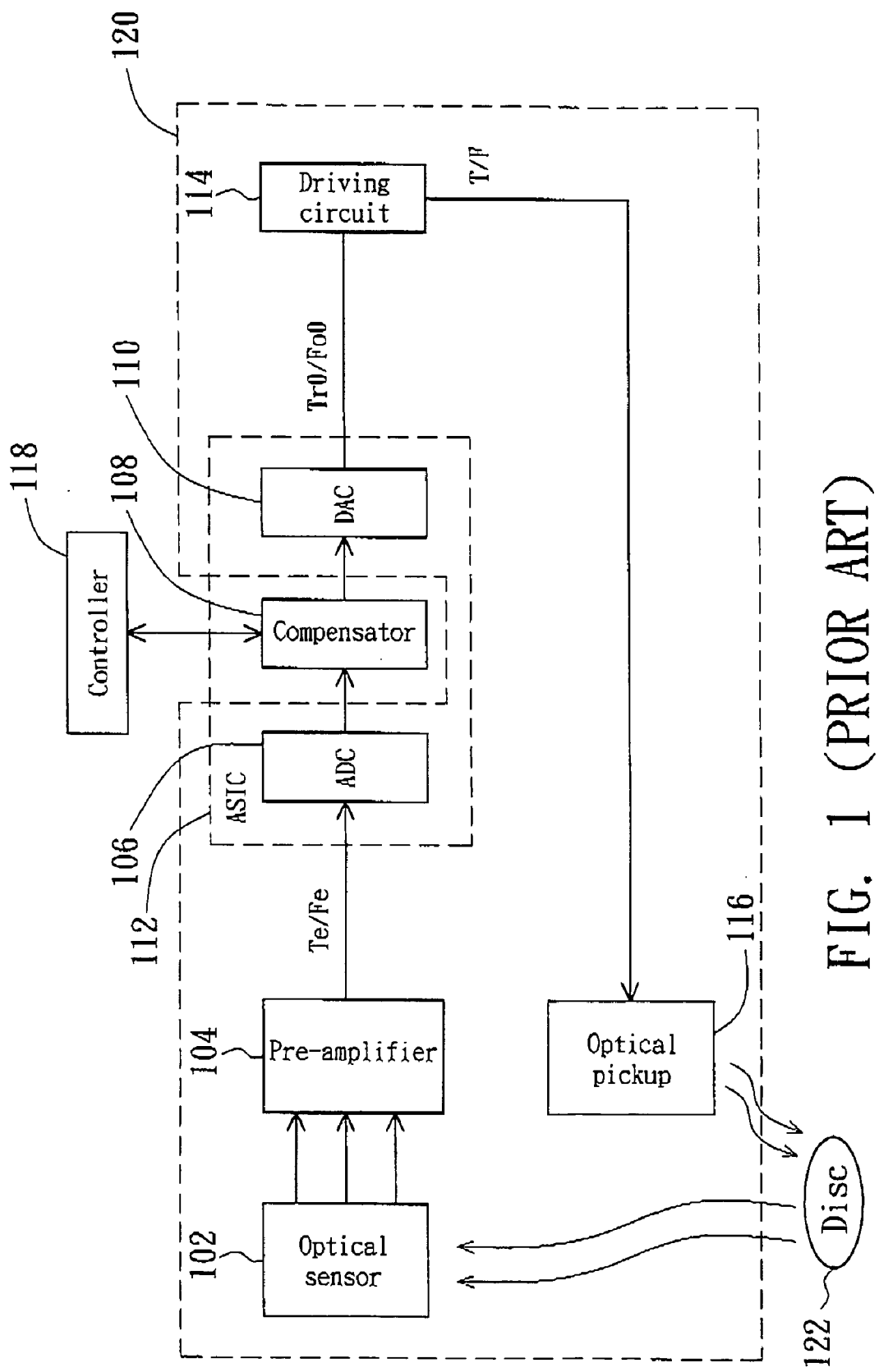
FIG. 1 is a block diagram showing a conventional optical disc drive servo system.
Figure 2:
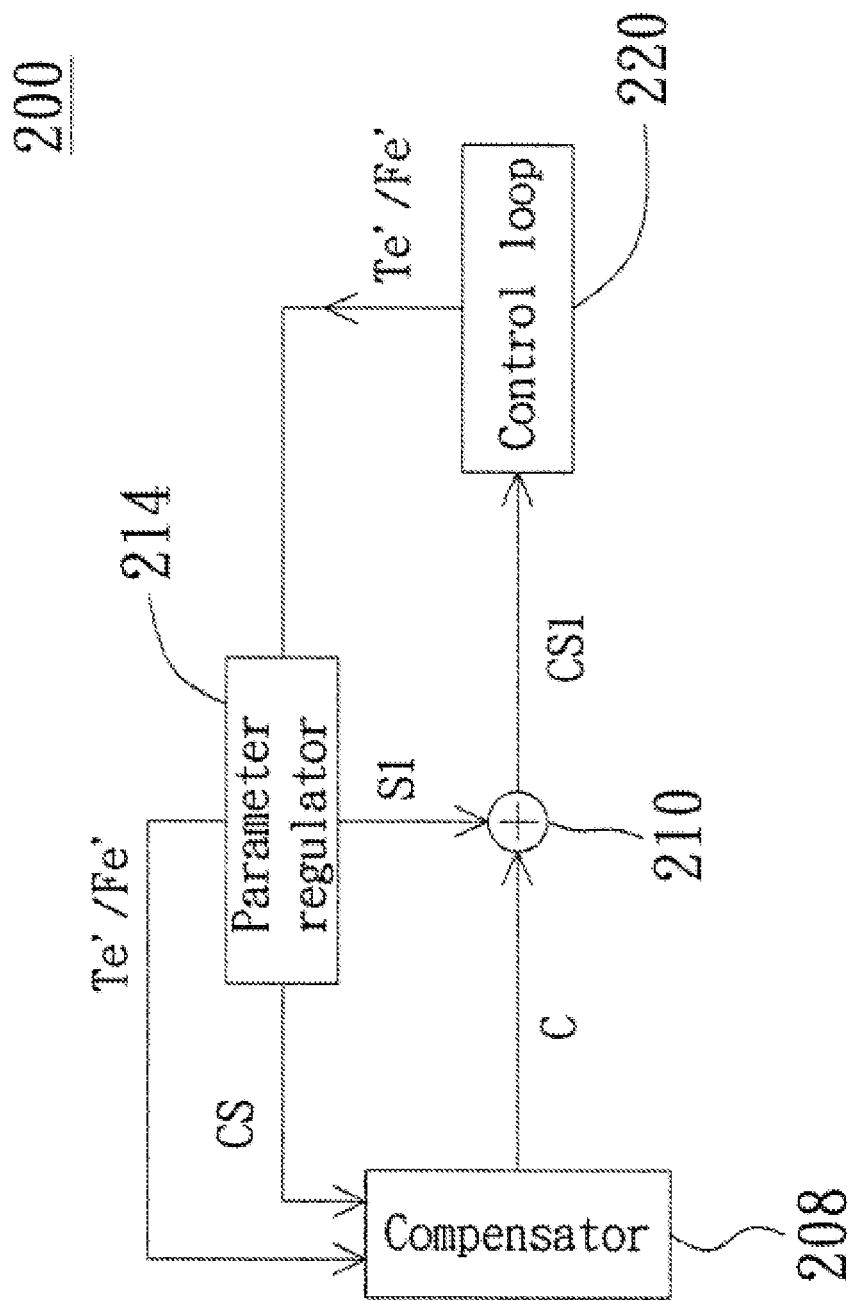
FIG. 2 is a block diagram of an optical disc drive servo system applied to the invention.

FIG. 2 is a block diagram of an optical disc drive servo system applied to the invention. Referring to FIG. 2, the optical disc drive server system 200 has a compensator 208, an adder 210, a control loop 220 and a parameter regulator 214. The adder 210 and the control loop 220 receive the compensated signal C and the first sinusoidal signal S1 and generate a first tracking error signal/focus error signal Te'/Fe'. The control loop 220 controls the reading/writing operation of the optical disc drive server. The parameter regulator 214 is for obtaining the control parameter CS of the optical disc drive server system 200 such that the compensator 208 adjusts the compensated signal C outputted therefrom according to first tracking error signal/focus error signal Te'/Fe'.

Figure 3:
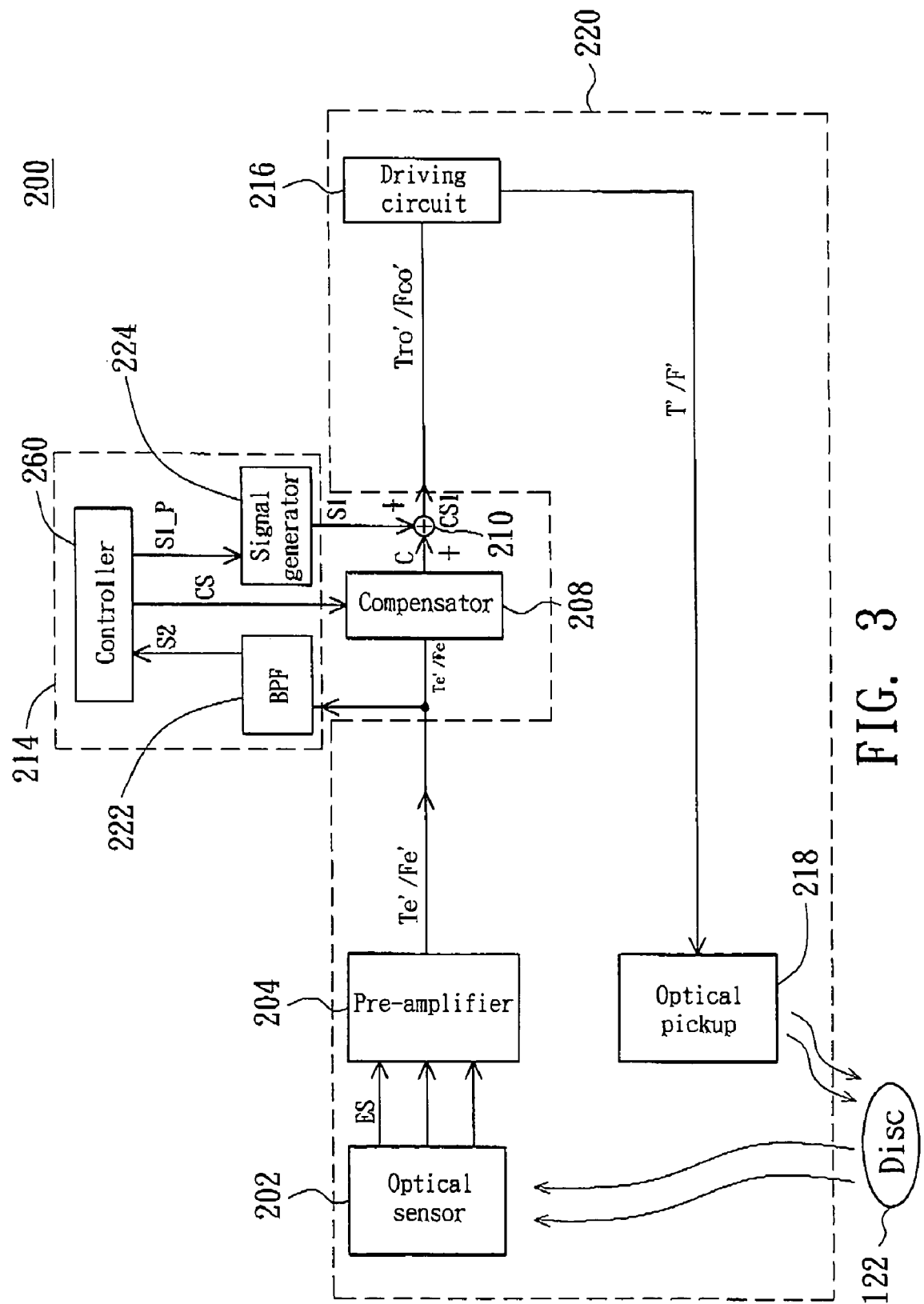
FIG. 3 is a detailed circuit diagram showing a first example of an optical disc drive servo system using the method for adjusting the control parameter of the invention.

FIG. 3 is a detailed circuit diagram showing a first example of an optical disc drive servo system 200 using the method for adjusting the control parameter of the invention. The control loop 220 includes an optical sensor 202, a pre-amplifier 204, a driving circuit 216 and an optical pickup 218. The optical sensor 202 receives a reflected light ray from the disc (not shown) and converts the light ray into an electric signal ES. The pre-amplifier 204 converts the electric signal ES into the first tracking error signal/focus error signal Te'/Fe' and the compensator 208 adjusts the first tracking error signal/focus error signal Te'/Fe' to obtain a compensated signal C. The driving circuit 216 receives the compensated signal C. The driving circuit 216 drives the optical pickup 218 to generate a light beam to read/write the disc. The parameter regulator 214 includes a signal generator 224, a band-pass filter (BPF) 222 and a controller 260.

The controller 260 outputs a signal control parameter S1_P to the signal generator 224 to control the signal generator 224 to generate a first sinusoidal signal Si corresponding to the signal control parameter S1_P. The adder 210 adds the first sinusoidal signal S1 to the compensated signal C to obtain a sum, which is then inputted to the control loop 220. The control loop 220 amplifies the first sinusoidal signal S1 to obtain a second sinusoidal signal S2. The BPF 222 receives the first tracking error signal/focus error signal Te'/Fe' and the second sinusoidal signal S2 of the control loop 220, and filters the second sinusoidal signal S2 and outputs the second sinusoidal signal S2 to the controller 260. The controller 218 calculates a relationship between the second sinusoidal signal S2 and the first sinusoidal signal S1 to obtain the first tracking error signal/focus error signal Te'/Fe'. The compensator 208 is controlled by the parameter regulator 214, receives the first tracking error signal/focus error signal Te'/Fe' and the first tracking error signal/focus error signal Te'/Fe', and adjusts the first tracking error signal/focus error signal Te'/Fe' according to the first tracking error signal/focus error signal Te'/Fe' so as to output the compensated signal C to the control loop 220.

Figure 4:
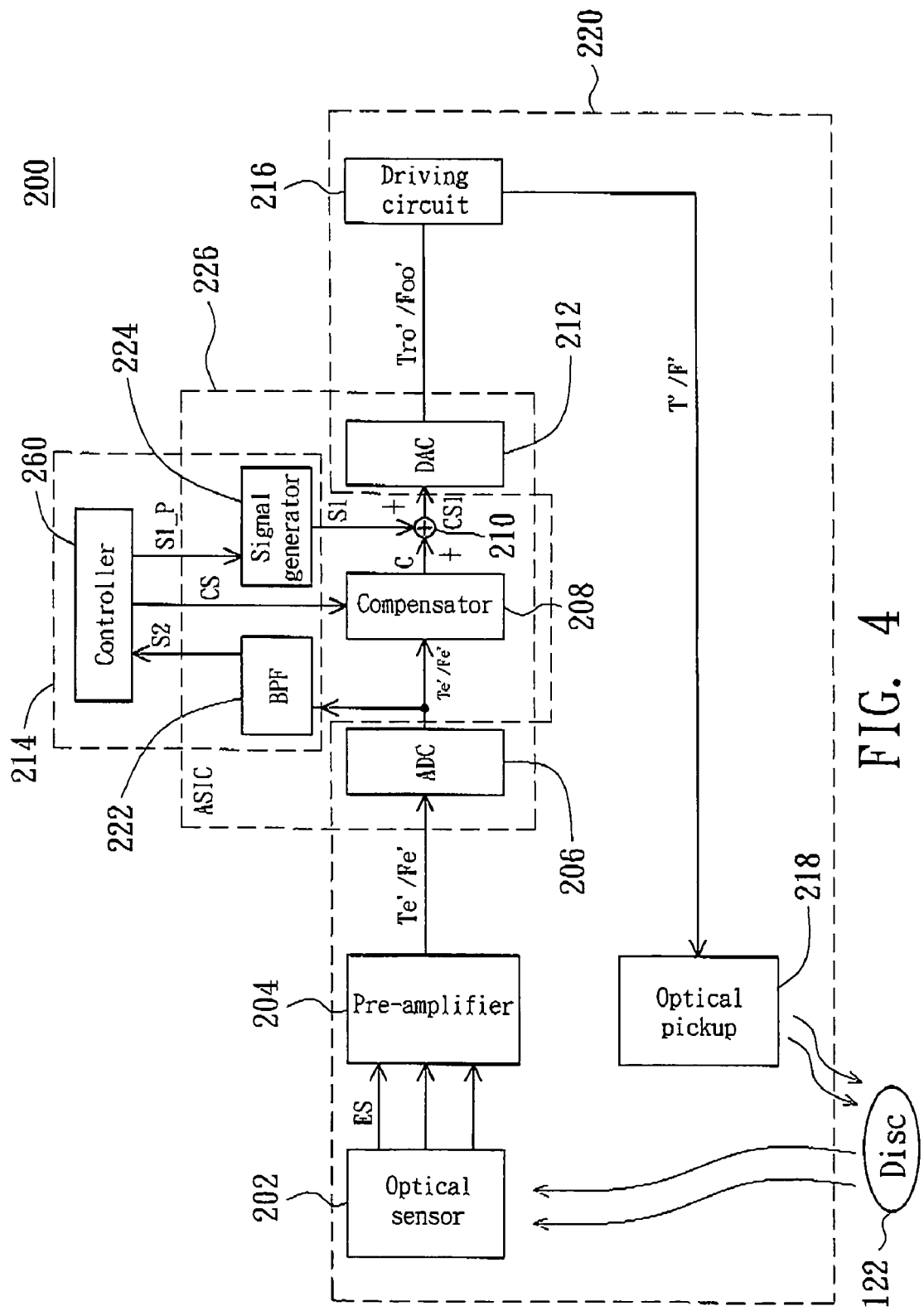
FIG. 4 is a detailed circuit diagram showing a second example of an optical disc drive servo system using the method for adjusting the control parameter of the invention.

FIG. 4 is a detailed circuit diagram showing a second example of an optical disc drive servo system using the method for adjusting the control parameter of the invention. Referring to FIG. 4, the control loop 220 may further include an ADC 206 and a DAC 212 such that the optical sensor 202 received the optical signal reflected by the disc (not shown) and converts the optical signal into the electric signal ES to be outputted to the pre-amplifier 204, and then the first tracking error signal/focus error signal Te'/Fe' is thus obtained. The first tracking error signal/focus error signal Te'/Fe' further may be processed by the ADC 206 and then inputted to the compensator 208.

After an input signal CS1, which is a sum of the compensated signal C and the first sinusoidal signal S1, is inputted to the DAC 212, a second tracking error signal/focus error signal Tro'/Foo' is obtained. The second tracking error signal/focus error signal Tro'/Foo' is inputted to the driving circuit 216, which generates a control signal T'/F' for controlling a position of the optical pickup 218. The laser diode (not shown) of the optical pickup 218 generates a laser beam to read/write the disc. The ADC 206, the compensator 208, the DAC 212, the BPF 222 and the signal generator 224 may be designed in the same ASIC 226.

It is assumed that the amplitude of the first sinusoidal signal S1 generated by the signal generator 224 is A, and the gain of the control loop constituted by the compensator 208, the DAC 212, the driving circuit 216, the optical pickup 218, the optical sensor 202, the pre-amplifier 204 and the ADC 206 is G. In this case, after the input signal CS1 is processed by the control loop 220, the first sinusoidal signal S1 of the input signal CS1 is amplified G times. Thus, the component amplitude of the second sinusoidal signal 52 of the input signal CS1 is G times that of the amplitude A of the first sinusoidal signal S1. As a result, after the BPF 222 has filtered the sinusoidal signal component and the filtered signal has been inputted to the controller 260, the controller 260 can obtain the G value according to the amplitude GA of the second sinusoidal signal 52 and can obtain the phase change of the second sinusoidal signal 52 component. Consequently, the controller 260 can adjust the first tracking error signal/focus error signal Te'/Fe' with respect to the compensator 208 according to the variation of the G value and the phase change. For example, the control parameter CS is adjusted according to a ratio of a second amplitude GA of the second sinusoidal signal S2 to a first amplitude A of the first sinusoidal signal S1, or the control parameter CS is adjusted according to a difference between a second phase of the second sinusoidal signal S2 and a first phase of the first sinusoidal signal S1. The controller 260 can change the gain of the compensator 208 with respect to the compensated signal C, or change the phase delay value or phase leading value of the compensated signal C.

Hence, the controller 260 can obtain the gain variation of the control loop caused by the temperature variation, or the physical property change of the component according to the first sinusoidal signal S1 after the optical disc drive server system 200 has operated for a long period of time.

The method for adjusting the control parameter and the optical disc drive server system using the same according to the above-mentioned embodiment of the invention can precisely obtain the gain variation of the control loop 220 in order to adjust the output of the compensator 208. Thus, the optical disc drive server system of the invention becomes more stable than the conventional optical disc drive server system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for adjusting a control parameter being adopted in an optical disc drive server system, the optical disc drive server system having a compensator, a control loop and a parameter regulator, the control loop comprising an optical sensor, a pre-amplifier, a driving circuit and an optical pickup, wherein the optical sensor receives a reflected light ray from a disc and converts the reflected light ray into an electric signal, the pre-amplifier converts the electric signal into a first tracking error signal/focus error signal, the compensator adjusts the first tracking error signal/focus error signal to obtain a compensated signal, the driving circuit receives the compensated signal, the optical pickup is driven by the driving circuit, and the optical pickup generates a light beam to read/write the disc, the method comprising the steps of:

outputting a first sinusoidal signal from the parameter regulator to the control loop, wherein a second sinusoidal signal is obtained after the control loop amplifies the first sinusoidal signal; and enabling the parameter regulator to filter the second sinusoidal signal and calculate a relationship between the first sinusoidal signal and the second sinusoidal signal to obtain the control parameter, wherein the control parameter is outputted to the compensator, and the compensator adjusts the compensated signal according to the control parameter.

2. The method according to claim 1, wherein the control parameter is adjusted according to a ratio of a second amplitude of the second sinusoidal signal to a first amplitude of the first sinusoidal signal.

3. The method according to claim 2, wherein the control parameter is adjusted according to a difference between a second phase of the second sinusoidal signal and a first phase of the first sinusoidal signal.

4. The method according to claim 3, wherein the control parameter is for changing a gain of the compensator with respect to the compensated signal, or changing a phase delay value or a phase leading value of the compensator with respect to the compensated signal.

5. An optical disc drive server system, comprising:
a compensator;
a control loop, which comprises:
an optical sensor for receiving a reflected light ray from a disc and converting the reflected light ray into an electric signal;
a pre-amplifier for converting the electric signal into a first tracking error signal/focus error signal, wherein the compensator adjusts the first tracking error signal/ focus error signal to obtain a compensated signal;
a driving circuit for receiving the compensated signal; and
an optical pickup driven by the driving circuit, wherein the optical pickup is for generating a light beam to read/write the disc; and
a parameter regulator, which comprises:
a signal generator for generating a first sinusoidal signal, wherein the first sinusoidal signal and the compensated signal are inputted to the control loop, and a second sinusoidal signal is obtained after the first sinusoidal signal is amplified by the control loop;
a band-pass filter for receiving the first tracking error signal/focus error signal and the second sinusoidal signal, and filtering the second sinusoidal signal; and
a controller for calculating a relationship between the second sinusoidal signal and the first sinusoidal signal so as to obtain a control parameter, wherein the compensator adjusts the compensated signal according to the control parameter.

6. The system according to claim 5, wherein the controller calculates a ratio of a second amplitude of the second sinusoidal signal to a first amplitude of the first sinusoidal signal so as to obtain the control parameter.

7. The system according to claim 6, wherein the controller calculates a difference between a second phase of the second sinusoidal signal and a first phase of the first sinusoidal signal so as to obtain the control parameter.

8. The system according to claim 7, wherein the controller adjusts the compensator according to the control parameter, changes a gain of the compensator with respect to the compensated signal, or changes a phase delay value or a phase leading value of the compensator with respect to the compensated signal.

9. A parameter regulator for being used in an optical disc drive server system, which has a compensator and a control loop, wherein the control loop comprises an optical sensor, a pre-amplifier, a driving circuit and an optical pickup, the optical sensor receives a reflected light ray from a disc and converts the reflected light ray into an electric signal, the pre-amplifier converts the electric signal into a first tracking error signal/focus error signal, the compensator adjusts the first tracking error signal/focus error signal to obtain a compensated signal, the driving circuit receives the compensated signal, the optical pickup is driven by the driving circuit and is for generating a light beam to read/write the disc, and the parameter regulator is for obtaining a reflected light ray of the optical disc drive server system such that the compensator adjusts the compensated signal according to the control parameter, the parameter regulator comprising:

a signal generator for generating a first sinusoidal signal and inputting the first sinusoidal signal to the control loop, wherein a second sinusoidal signal is obtained after the first sinusoidal signal has amplified the control loop;

a band-pass filter for receiving the first tracking error signal/focus error signal and the second sinusoidal signal, and filtering the second sinusoidal signal; and a controller for calculating a relationship between the second sinusoidal signal and the first sinusoidal signal so as to obtain the control parameter, wherein the optical disc drive server system further has an adder for adding the first sinusoidal signal to the compensated signal so as to obtain a sum, and inputting the sum to the control loop.

10. The parameter regulator according to claim 9, wherein the controller calculates a ratio of a second amplitude of the second sinusoidal signal to a first amplitude of the first sinusoidal signal so as to obtain the control parameter.

11. The parameter regulator according to claim 10, wherein the controller calculates a difference between a second phase of the second sinusoidal signal and a first phase of the first sinusoidal signal so as to obtain the control parameter.

12. The parameter regulator according to claim 11, wherein the controller adjusts the compensator according to the control parameter, changes a gain of the compensator with respect to the compensated signal, or changes a phase delay value or a phase leading value of the compensator with respect to the compensated signal.

* * * * *